Sept. 8, 1953 M. SPERTUS 2,651,129
PICTURE FRAME FOR COLORED PHOTOGRAPHS
Filed Aug. 10, 1950 2 Sheets-Sheet 1
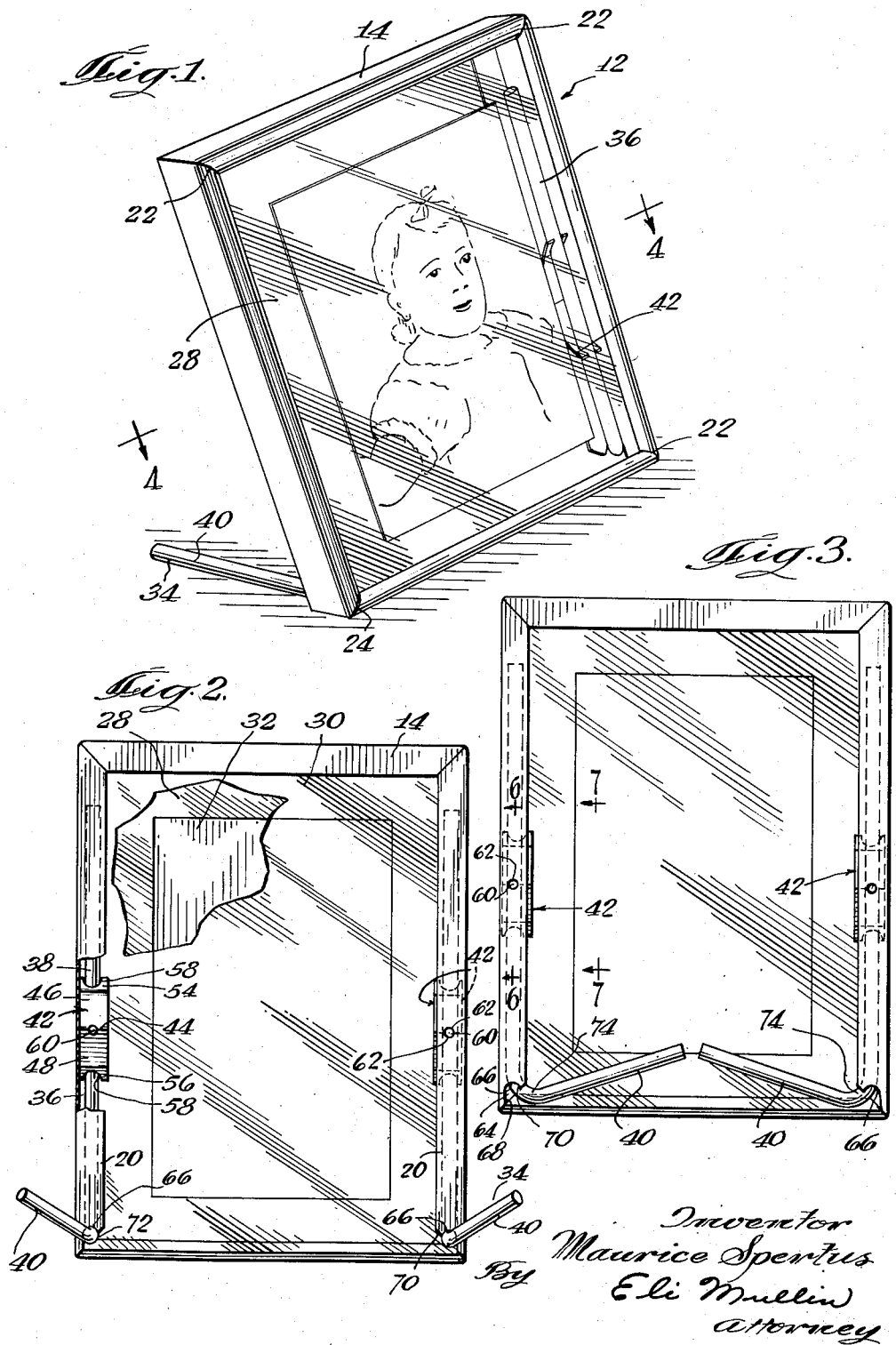
Inventor
Maurice Spertus
By Eli Mullin
Attorney

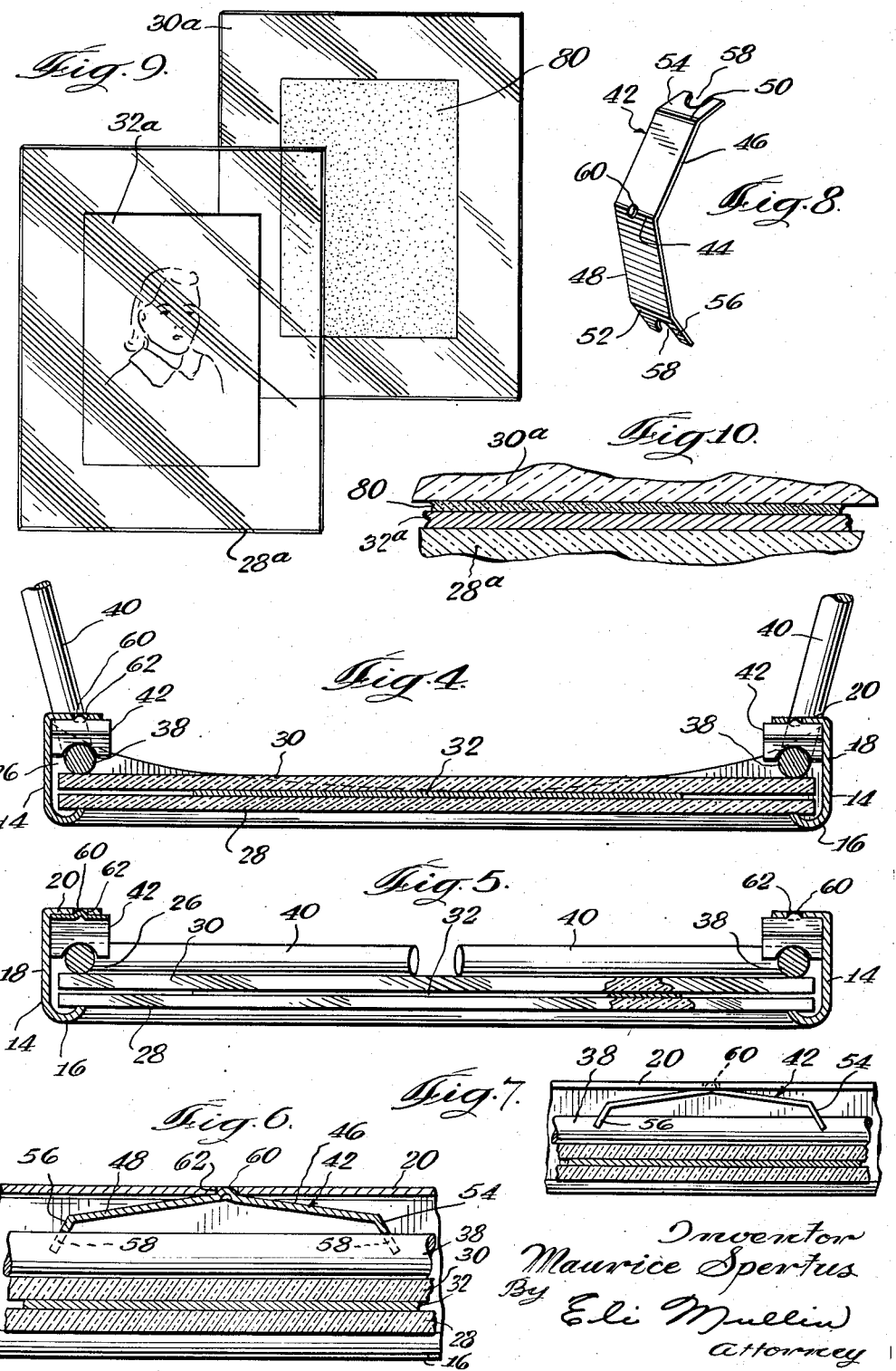

Patented Sept. 8, 1953

2,651,129

UNITED STATES PATENT OFFICE 2,651,129

PICTURE FRAME FOR COLORED PHOTOGRAPHS

Maurice Spertus, Highland Park, Ill.

Application August 10, 1950, Serial No. 178,691

6 Claims. (Cl. 40—152.1)

This invention relates to picture frames and more particularly to improvements in picture frames especially adapted for displaying colored photographs. Specifically the device is designed to illuminate the photograph by affording an opportunity for light to be transmitted therethrough in addition to being reflected from the surface thereof.

It is well known that colored photographs are ordinarily developed and printed on film (transparencies) or translucent sheets of acetate. These photographs are adapted to be mounted in picture frames. Heretofore, these picture frames were usually provided with a glass front and a sheet of opaque backing-material such as paste-board, simulated leather and the like; the photograph being mounted therebetween. Obviously such an opaque backing effectively barred the passage of light-rays therethrough so that the visibility of the photograph was wholly dependent upon reflected light passing through the glass front.

It is therefore an important object of this invention to provide a picture frame which will overcome this objection. A related object is to afford a picture frame with a transparent back which will admit light therethrough so that the same may pass through the photograph.

Another object is to provide a picture frame which will to some extent create an illusion of depth to the photograph contained therein so that a more life-like image will result.

A further object is to afford a picture frame in which an additional but inanimate light source may be included therein. An object relating thereto is to impart a luminescent or fluorescent coating to one of the glass surfaces.

Heretofore, in the opaque-back type of picture frames, easels or other supporting devices were afforded by merely cutting out and hinging central portions of the backing. With the advent of the presently described transparent backs which ordinarily comprise sheets of glass, this supporting device can no longer be employed. It is therefore another important object to provide effective supporting means for transparent picture frames.

Yet a further object is to afford a supporting means which will also serve as a device for removably locking the photograph and component parts within the frame.

Still another object is to provide a supporting device with easels or legs which may be folded to permit ready packing for shipment.

Still a further object is to afford supporting devices which are substantially hidden so that they do not detract from the appearance of the framed photograph.

And yet another object is to provide a picture frame for colored photographs of simple, inexpensive construction, yet very attractive and most effective for the display of such photographs.

With the foregoing and other objects in view which will appear as the description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of my invention, I have illustrated in the accompanying drawings preferred embodiments thereof, from an inspection of which, when considered in connection with the following description, my invention, its mode of construction, assembly and operation, and many of its advantages should be readily understood and appreciated.

Referring to the drawings in which the same characters of reference are employed to indicate corresponding or similar parts throughout the several figures of the drawings:

Fig. 1 is a perspective view of my improved picture frame in operational position with a photograph mounted therein;

Fig. 2 is a rear elevational view with portions broken away to show certain details of construction and with the easel legs extended to operational position;

Fig. 3 is a view similar to Fig. 2 but showing the easel legs folded to position for packing and shipping;

Fig. 4 is a sectional view taken on the plane of line 4—4 in Fig. 1 and likewise showing the easel legs extended to operational position;

Fig. 5 is a view similar to Fig. 4 but showing the easel legs folded.

Fig. 6 is an enlarged fragmentary sectional view taken on the plane of line 6—6 in Fig. 3 and viewed in the direction indicated;

Fig. 7 is a fragmentary sectional view taken on the plane of line 7—7 in Fig. 3 and viewed in the direction indicated;

Fig. 8 is a perspective view of one of the component parts of the picture frame;

Fig. 9 is an exploded view showing, in elevation, parts of a modified form of my invention; and Fig. 10 is a fragmentary cross-sectional view of the modification.

Turning now to Fig. 1 of the drawings reference numeral 12 indicates generally a picture frame comprising a rectangular, substantially channel-shaped frame 14 which may be made of any suitable material but in the embodiment chosen for illustration is made of metal such as brass. This frame 14 may be formed from a single length of strip formed into a channel which in cross-section, as shown in Figs. 4 and 5, comprises a rounded front segment 16, a flat side segment 18 and a flat rear segment 20 formed at right angles to the plane of the side segment 18. The length of channel may then be bent and mitered as at the corners 22 to afford the rectangular picture frame 14, the frame being completed by joining the channel ends together in one corner as by welding at 24.

The segments 16, 18 and 20 define a continuous groove 26 into which the marginal edges of a pair of transparent members such as panes of glass 28 and 30, which previously have been cut to the proper size, may be inserted. A photograph 32 which may comprise a colored image reproduced on a sheet of acetate material is first positioned between the glass panes 28 and 30 so that the same is pressed therebetween and thereby secured and protected.

To secure the glass panes with the photograph in the frame 14 a novel wedging device, which also comprises means for supporting the picture frame in an inclined but substantially upright position, is utilized. This wedging-supporting device comprises a pair of metal rods 34 and 36 bent to afford easels each having a vertical leg 38 and a leg 40 which may be bent to lie in a plane somewhat less than ninety degrees from that of the vertical leg. The vertical legs 38 are then inserted in the groove 26 of the frame 14 and positioned behind the marginal edges of the glass 30. Spring wedging devices such as 42 are then interposed between the rear frame segment 20 and the easel legs 38 to lock the photograph and glass assembly securely within the frame 14.

These novel spring wedging devices 42, illustrated in Fig. 8 of the drawings, comprise a strip of spring metal bent along its horizontal mid axis or apex as at 44 to afford angularly disposed sides such as 46 and 48. The end portions of the sides 46 and 48 are again bent angularly along horizontal axes 50 and 52 to afford leg segments 54 and 56. Each of these leg segments 54 and 56 have aligned, open, semi-circular grooves such as 58 cut centrally in the ends thereof, which grooves are adapted to embrace the easel legs 38 as shown in Figs. 4, 5, 6 and 7 of the drawings.

A detent 60 is formed at the apex 44 so that the detent protrudes upwardly. This detent 60 is designed to fit within an opening 62 formed in the rear segment 20 of the frame 14. The purpose of this construction will become apparent as the description proceeds.

In normal operational position the easel legs 40 are extended so that the frame 14 may be supported in photograph-displaying position, as shown in Figs. 1, 2 and 4 of the drawings. However, for the purposes of convenience in packing and shipping it is desirable that these legs 40 be folded inwardly until they lie flat against the back of the rear glass 30, as shown in Figs. 3 and 5 of the drawings.

To permit such folding of the legs 40 and to also limit the extent to which the legs may be spread or extended outwardly, a simple but most effective structure is utilized.

The bottom edges of the vertical sides of the rear segments 20 of frame 14 is cut-out as at 64. These cut-outs 64 are formed with an open central groove 66 defined by outer side edges 68 and shorter inner side edges 70 leaving inner gaps 72 between the bottom of the inner side edges 70 and the bottom of the frame. In their extended positions the easel rods 34, are adapted to lie within the groove 66 as at the bent corner 74; the extent of their outward rotation being limited by the rod portions 74 bearing against the inner side edges, as shown in Fig. 2. However when it is desired to move the legs 40 to their inward folded position, as shown in Figs. 3 and 5 of the drawings, the legs are merely rotated until they rest against the back of the glass 30; the curved corners 74 being moved through the gaps 72 so that they do not bear against the edges 70.

In assembling the picture frame, the photograph may first be placed between the glass panes 28 and 30 and these panes then positioned within the frame 14 as heretofore indicated. The spring wedges 42 may then be mounted on the easel legs 38 with portions of such legs positioned within the aligned grooves 58 and the spring wedges themselves positioned on the leg 38 with the detent 60 approximately aligned with the opening 62. The wedge 42 is then flexed downwardly until it is compressed sufficiently to admit the assembly of the rod and wedge within the groove 26 under the channel rear wall 20. The assembly is then pushed back into the groove until the protruding detent 60 enters the opening 62. The tendency of the spring to expand to its normal position effectively locks the easel legs 38 and the glass panes and photograph within the frame 14. At the same time the edges of the wedge grooves 58 tend to bite into the easel legs 38 (the easel rods being made of a softer metal than the spring metal of the wedges) to prevent their longitudinal displacement. Nevertheless this effective wedging action does not prevent the lateral rotation of the easel legs to folding or operational position as above described. To disassemble the picture frame, the easel rods 34 and 36 are merely pulled inwardly until the wedges 42 are compressed sufficiently to permit the detents 60 to move down and out of the openings 62 and the wedges themselves then moved out from the grooves 26.

It has been observed that photographs positioned within such fully transparent frames are not only more clearly brightened and visibly displayed but appear much more life-like than the same photographs displayed in conventional picture-frames. This is especially true of colored photographs. Although the theoretical explanation of this phenomenon is not entirely clear, it is apparent that the index of refraction of the glass tends to create an observable double image effect, sufficient to impress upon the eyes of the observer the illusion of depth.

In Figs. 9 and 10 of the drawings a modification of the principal embodiment of this invention is illustrated. This modification shows how an auxiliary light source may readily be added to the picture frame. Similar parts are indicated by like numerals with the added suffix "a."

In this modification a coating 80 of luminescent or fluorescent pigment is applied to the inner surface of the glass pane 30a. When the fluorescent particles of the pigment are excited by light passing through the front glass pane 28a and the acetate photograph 32a, they are activated so that light emanates therefrom thus affording another light source for illuminating the photograph. In order not to screen the light rays admitted from the rear of the photograph, it has been found that best results are obtained by using a pigment comprising luminescent dye particles suspended in a translucent or transparent plastic vehicle.

It should be noted that although the photograph 32 has been illustrated in the drawings as being of somewhat smaller dimension than that of the glass panes 28 and 30, this has been done for illustrative purposes only. As a matter of fact it is more desirable to utilize a frame whose dimensions approximate that of the photograph.

It is believed that my invention, its mode of construction and assembly, and many of its advantages should be readily understood from the foregoing without further description, and it should also be manifest that while preferred embodiments of the invention have been shown and described for illustrative purposes, the structural details are nevertheless capable of wide variation within the purview of my invention as defined in the appended claims.

What I claim and desire to secure by Letters Patent of the United States is:

1. In a device of the character described comprising in combination a frame formed from a length of channel-shaped strip affording a continuous groove, a pair of glass panes adapted to being mounted with the marginal edges thereof disposed in said groove, and a plurality of spring wedging devices positioned within said groove to lock said panes within said frame, a pair of frame supporting devices wedged within the groove of said frame, said supporting devices comprising angularly bent rods having vertical and horizontally inclined legs, said wedging devices comprising angularly bent strips of spring metal positioned to bear against said vertical legs for wedging the same in rotatable relationship within the grooves of said frame.

2. In a device of the character described comprising a frame formed from a length of channel-shaped strip affording a continuous groove defined by front, back and side walls, a pair of glass panes mounted with the marginal edges thereof disposed within said groove, spring wedging devices wedged within said groove, between said back wall and the marginal edges of said glass panes, each of said wedging devices comprising an angularly bent strip of spring metal with a raised detent formed in the apex thereof, and portions of the back-wall of said channel frame formed with an opening, said opening shaped to receive therein said detent.

3. The device of claim 2 characterized by easel rods rotatably mounted within said groove, said easel rods supporting said frame in a vertically inclined plane and said wedging device having end portions formed with semi-circular open grooves, said latter mentioned grooves shaped to receive therein portions of said rods.

4. In a device of the character described comprising a frame formed from a length of channel-shaped strip affording a continuous groove defined by front, back and side walls, a pair of glass panes mounted with the marginal edges thereof disposed within said groove, a pair of supporting easels comprising angularly bent rods each having a vertical leg and a horizontally inclined leg, said vertical leg mounted within said groove, spring wedging devices positioned within said groove, said wedging devices clamping said rods within said grooves in rotatable relationship, said frame having bottom-end portions for limiting the outward rotation of the horizontally inclined legs of said rods.

5. In a picture frame for colored photographs comprising a substantially rectangular-shaped frame containing a groove therein, a pair of panes of glass mounted with the marginal edges thereof disposed in said groove, a plurality of supporting members having portions thereof likewise disposed in said groove, and wedging devices wedging said supporting member portions between the marginal edges of the glass and the frame to lock said panes of glass within said frame, said wedging devices comprising angularly bent strips of spring metal.

6. In a device of the character described comprising a frame formed from a length of channel-shaped strip affording a continuous groove, a pair of glass panes mounted with the marginal edges thereof disposed in said groove, a pair of spring wedging members each comprising an angularly bent strip of spring metal positioned within said groove, and a pair of frame-supporting devices, portions of said devices wedged against the marginal edges of said glass panes by the wedging members positioned within said groove, said wedging members abutting the marginal edges of the glass panes and portions of said channel-shaped strip.

MAURICE SPERTUS.

References Cited in the file of this patent
UNITED STATES PATENTS

| Number | Name | Date |
| --- | --- | --- |
| 893,392 | Sincock | July 14, 1908 |
| 1,627,468 | Stitt | May 3, 1927 |
| 2,106,203 | Ashe | Jan. 25, 1938 |
| 2,124,353 | Plym | July 19, 1938 |
| 2,125,191 | Moore | July 26, 1938 |
| 2,213,868 | Lucian | Sept. 3, 1940 |
| 2,313,453 | Rubel | Mar. 9, 1943 |
| 2,480,584 | Kohlhauer | Aug. 30, 1949 |
| 2,521,603 | Prew | Sept. 5, 1950 |
| 2,550,926 | Herz | May 1, 1951 |
| 2,593,195 | Rosenberg | Apr. 15, 1952 |